(12) United States Patent
Austin (10) Patent No.: US 11,339,852 B1
(45) Date of Patent: May 24, 2022

(54) ADJUSTABLE HOOK WITH STRAP

(71) Applicant: Daniel Austin, Pomona, CA (US)

(72) Inventor: Daniel Austin, Pomona, CA (US)

( * ) Notice: Subject to any disclaimer, the term of this patent is extended or adjusted under 35 U.S.C. 154(b) by 0 days.

(21) Appl. No.: 17/241,419

(22) Filed: Apr. 27, 2021

(51) Int. Cl.
*F16G 11/00* (2006.01)
*F16B 2/08* (2006.01)
*F16G 11/10* (2006.01)

(52) U.S. Cl.
CPC .............. *F16G 11/106* (2013.01); *F16B 2/08* (2013.01); *Y10T 24/3947* (2015.01)

(58) Field of Classification Search
CPC ..... Y10T 24/3991; Y10T 24/39; Y10T 24/14; Y10T 24/1498; Y10T 24/1404; Y10T 24/1402; Y10T 24/141; Y10T 24/394; Y10T 24/3947; A62B 1/14; F16G 11/10
See application file for complete search history.

(56) References Cited

U.S. PATENT DOCUMENTS

| | | |
|---|---|---|
| 3,275,969 A * | 9/1966 | Sheeran ............... H02G 11/003 439/527 |
| 3,446,484 A | 5/1969 | Walsh et al. |
| D222,428 S | 10/1971 | Stein |
| D246,286 S | 11/1977 | Moore |
| D347,507 S | 5/1994 | Austin |
| D349,839 S | 9/1994 | Gilardelli |
| D391,840 S | 3/1998 | Striebel |
| 6,223,372 B1 | 5/2001 | Barber |
| 6,561,313 B2 | 5/2003 | Hewlett et al. |
| 6,843,346 B2 | 1/2005 | LeBeau et al. |
| 7,320,159 B2 | 1/2008 | Petzl et al. |
| 7,475,456 B2 | 1/2009 | Thompson |
| 7,540,074 B2 | 6/2009 | Thompson |
| 7,845,467 B2 | 12/2010 | Petzl et al. |
| 7,946,006 B2 | 5/2011 | Thompson |
| D649,018 S | 11/2011 | Kope |
| 8,060,994 B2 | 11/2011 | Petzl et al. |
| D649,862 S | 12/2011 | Arvinte et al. |
| 8,276,247 B2 | 10/2012 | Yang |
| D684,452 S | 6/2013 | Petzl |
| 8,474,112 B2 | 7/2013 | Thompson |
| D708,047 S | 7/2014 | Petzl |
| 8,905,449 B2 | 12/2014 | Calvert |
| D726,123 S | 4/2015 | Su et al. |
| 9,003,617 B2 | 4/2015 | Walker |
| D730,159 S | 5/2015 | Grimm |
| D730,722 S | 6/2015 | Grimm |

(Continued)

*Primary Examiner* — Robert Sandy
*Assistant Examiner* — Michael S Lee
(74) *Attorney, Agent, or Firm* — Kirk A. Buhler; Buhler & Associates Patenting (57) ABSTRACT

Improvements in a line brake with strap. The brake is a one-way brake that allows a user to pull the line through the brake to shorten the length of the line and when tension in the opposite direction is placed on the line, the brake prevents the length of the line from extending through the brake. The strap is flexible and can be completely opened to freely wrap around a post, pole, line, rail, cord, capstan, handrail, cleat, post, cord or anchor, where a free end of the pole can't be easily reached over, though, under or around. The strap has a key opening that prevents the strap from easily opening when the key is not linearly aligned and/or rotated. A tail on the strap further prevents accidental dislodging of the strap from the line brake.

20 Claims, 5 Drawing Sheets

(56) References Cited

U.S. PATENT DOCUMENTS

| | | |
|---|---|---|
| 9,091,295 B1 | 7/2015 | Yang et al. |
| D743,778 S | 11/2015 | Huang |
| 9,322,428 B2 | 4/2016 | Perner |
| D765,497 S | 9/2016 | Petzl |
| 9,573,002 B2 | 2/2017 | Lefebvre et al. |
| D786,049 S | 5/2017 | Austin |
| D827,418 S | 9/2018 | Austin |
| 2007/0062014 A1 | 3/2007 | Casebolt |
| 2007/0186393 A1 | 9/2007 | Thompson |
| 2008/0022497 A1 | 1/2008 | Thompson |
| 2008/0174130 A1 | 7/2008 | Lin |
| 2009/0056088 A1 | 3/2009 | Petzl et al. |
| 2011/0023275 A1 | 2/2011 | Thompson |
| 2011/0138587 A1 | 6/2011 | Walker et al. |
| 2011/0308049 A1* | 12/2011 | Sun .................. H01F 7/0263 24/306 |
| 2012/0011688 A1 | 1/2012 | Yang |
| 2013/0219673 A1 | 8/2013 | Perner |
| 2014/0110956 A1 | 4/2014 | Lin |
| 2014/0123447 A1 | 5/2014 | Calvert |
| 2014/0245576 A1 | 9/2014 | Perner |
| 2015/0231423 A1 | 9/2015 | Perner |
| 2016/0061251 A1 | 3/2016 | Rogelja |
| 2016/0101302 A1 | 4/2016 | Perner |
| 2016/0152453 A1 | 6/2016 | Wescott et al. |
| 2016/0281766 A1 | 9/2016 | Moine et al. |
| 2016/0361578 A1 | 12/2016 | Casebolt et al. |
| 2016/0363159 A1 | 12/2016 | Yeh |

\* cited by examiner

ADJUSTABLE HOOK WITH STRAP

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a line brake with a strap. More particularly, the present line brake with a strap can be wrapped and secured around rail, handrails, posts and cleats.

Description of Related Art Including Information Disclosed Under 37 CFR 1.97 and 1.98

When handling a length of line the free end of the line can be difficult to maintain to control the free long length of the line. The free length can be coiled but when handling the coiled loop, the loop of line can easily spread thereby requiring the line to be coiled again. One method of handling the line is to wrap a free-end of the line around the line coil. When this happens use of the free end is eliminated. Using a tie wrap can hold the collected coil, but the tie wrap will need to be collected when not used and further does not provide a clamp that limits movement of the line.

A number of patents and or publications have been made to address these issues. Exemplary examples of patents and or publication that try to address this/these problem(s) are identified and discussed below.

U.S. Pat. No. 9,003,617 issued on Apr. 14, 2015 to Benjamin Walker et al., and is titled Multi-Chamber Carabiner. This patent discloses an automatically locking carabiner system including a frame, a gate, a gate biasing system, and a gate locking system. The frame and gate form a continuously enclosed inner region in a closed configuration with respect to the frame. When in an engaged state, the gate locking system is configured to automatically lock the gate in the closed configuration with respect to the frame. The gate locking system may include a trigger coupled to the frame such that the position of the trigger corresponds to the state of the gate locking system. The trigger may be positioned on an opposite side of the frame from the gate with respect to the inner region. While this patent provides multiple areas for the line to pass it does not include a brake.

U.S. Pat. No. 9,322,428 issued on Apr. 26, 2016 to Judd J. Perner and is titled Locking Carabiner. This patent discloses a locking carabiner comprises a body, a gate, and a lock. The body has a side interconnecting a top and a bottom forming an opening. The gate is pivotally connected to the bottom and is releasably connectable to the top, and the gate has closed and open positions. The lock is pivotally connected to the side and has locked and unlocked positions. The lock includes a trigger portion extending outward proximate the body's rear and a locking portion extending outward proximate the body's front. While this patent provides a fixed path for a line to pass, the line path does not provide a brake nor a strap that can be wrapped around a rail, handrails, posts and cleats.

U.S. Pat. No. 9,091,295 issued on Jul. 28, 2015 to Kai Chieh Yang et al., and is titled Safety Hook. This patent discloses a safety hook including a hook body, a latch member, a locking portion, and a control member is disclosed. The latch member is capable of rotating about a guide pin and swinging along a guide slot in an arc-shaped path to open or close a hook opening, wherein when the latch member locks and closes the hook opening, the locking portion and the guide pin form a locked chain structure to bear a lateral impact force on the latch member. While this patent provides an opening for a coiled line, the opening is not formed from a lockable strap.

U.S. Pat. No. D827418 and D786049 issued on Sep. 4, 2018 and May 9, 20217, respectively to Daniel Austin and are titled Anchor Hook. These patents disclose a line anchor they do not include a closable strap to secure a rail, handrails, posts and cleat.

What is needed is a line brake with a strap that allows a user to easily secure a loose rail, handrails, posts and cleats and further includes a brake for the loose end of the line. The line brake with a strap disclosed in this document provides the solution.

BRIEF SUMMARY OF THE INVENTION

It is an object of the line brake with a strap to include a line brake. The line brake allows the free length of the line to be limited. When the line is tied to an object like a fender or a buoy, the distance between the brake and the object can be maintained without using a knot or other permanent or semi-permanent tying.

It is an object of the line brake with strap for the brake to be one-way. The one-way brake allows a user to pull the line through the brake to shorten the length of the line and when the line is pulled in the opposite direction, the brake prevents the length of the line from extending through the brake. A spring on the brake lever maintains the clamp on the line through the brake.

It is an object of the line brake with strap for the brake to be self-closing. The self-closing feature ensures that the brake holds the position of the line until a user releases the brake to allow the line to be freely moved in both directions through the brake to extend or shorten the length of the line. The self-closing is with a rotating brake, clamp or finger that pivots within the housing.

It is an object of the line brake with strap to include a flexible strap for securing the strap around a post or a rail, handrail, post and cleat. The flexible strap can be completely opened to freely wrap around a rail, handrail, post and cleat where a free end of the pole can't be easily reached over, though, under or around.

It is another object of the line brake with strap for the strap to require a rotation of the strap to lock on the brake housing. The strap has a key opening that prevents the strap from easily opening when the key is not linearly aligned. A tail on the strap further prevents accidental dislodging of the strap from the line brake housing.

It is still another object of the line brake with strap for the length of the strap to be adjustable. The adjustable length allows for the interior diameter of the strap to be altered or adjusted to minimize the slack or size in the loop of the strap. Some or all of the strap could further be made from an elastomeric material to keep the strap tightly on the pole or rail, handrail, post and cleat while preventing the strap from being accidentally dislodged.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

Figure 1:
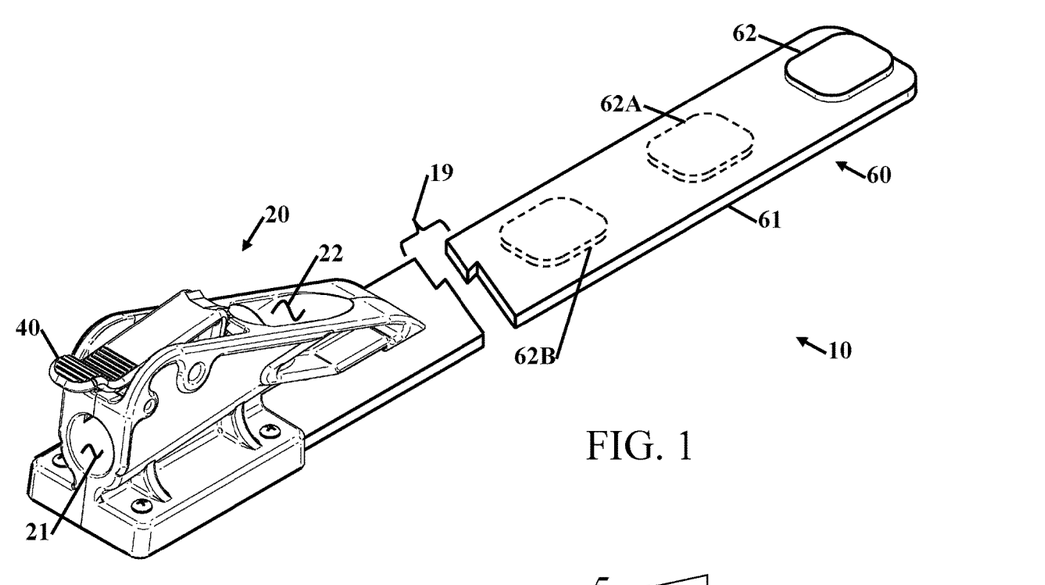
FIG. 1 shows a top rear perspective view of a line brake with a strap.

ITEM NUMBERS AND DESCRIPTION 10 line brake with a strap
18 line
19 break
20 housing
21 line inlet
22 line outlet
23 bottom
30 stud
40 locking tab
41 lever
42 teeth
43 pivot
44 spring hole
45 bottom of tab
46 saddle
47 tooth
50 screw
51 bottom
52 tab
58 elastic area
58B wrapped
59 stitching
60 strap
61 flexible strap
61B strap locked position
62 backer
62A alt backer
62B alt backer
63 slotted plate
64 key
65 shoulder
66 end
66B end
67 end-of-key
68 end
69 end
70 backer
70A backer
87 pulled
88 pulled
90 bent
91 moved
92 lifted
93 lifted/slide
94 rotated
98 push
99 rotate FIG. 1 shows a top rear perspective view of a line brake with a strap 10. The line brake with a strap 10 has a housing 20 made from a ridged plastic or metal housing. The housing 20 has a locking tab 40 that creates a brake that is configured to clamp a line that is passed through the line inlet 21 and to the line outlet 22 in a line passage. A strap 60 connects to the housing 20 at a first end. The strap 60 is a flexible strap 61 that is preferably made from a vulcanized soft rubber strap with layers of fiber reinforced. Near the end of the free end of the flexible strap 61 is a backer 62 that supports a keyed opening (not shown) on the underside of the flexible strap 61. This figure shows an embodiment with multiple backers 62A and 62B that allows the flexible strap 61 to be connected to the housing at different locations to change the inside diameter of the flexible strap 61 when the free end of the flexible strap 61 is secured to the housing 20.

Figure 2:
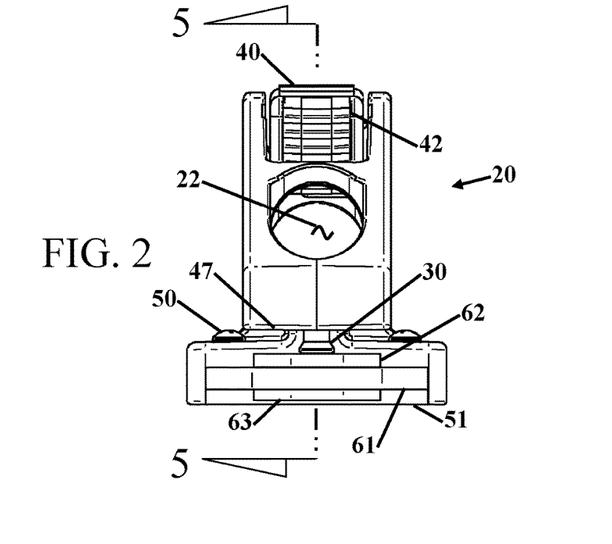
FIG. 2 shows a front view.
Figure 3:
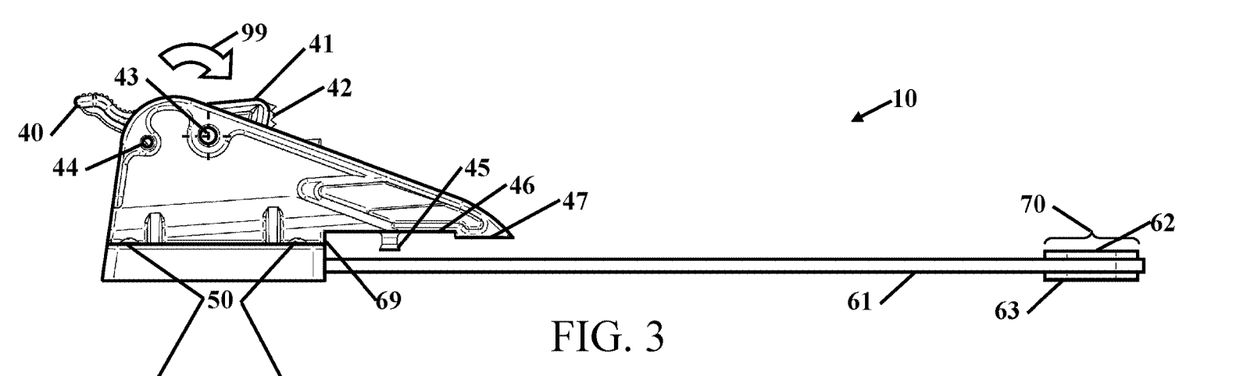
FIG. 3 shows a right-side view.
Figure 4:
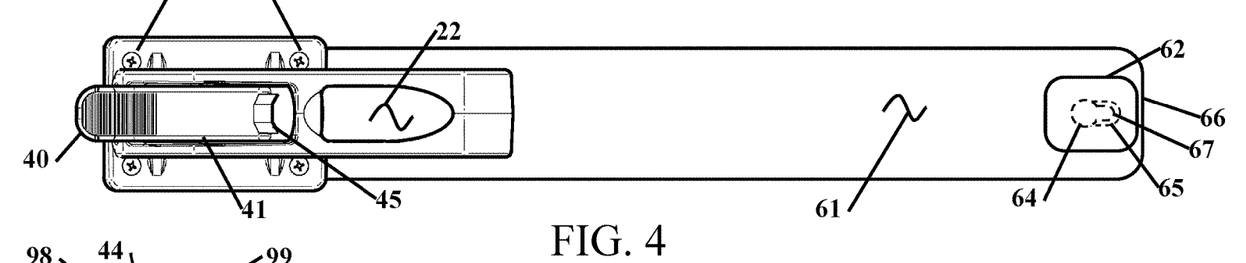
FIG. 4 shows a top plan view.

FIG. 2 shows a front view, FIG. 3 shows a right-side view and FIG. 4 shows a top plan view of the line brake with a strap. From FIG. 2, the line inlet 22 is shown where a line (or cable) can pass through the housing 20 of the line brake with a strap 10. The teeth 42 of the locking tab 40 are seen rotated above the housing 20. An internal spring (not shown) biases the locking tab 40 into the passage where the line passes. Below the front tooth 47 a stud 30 is visible. The stud 30 connects at a first end to the bottom of the tooth 47 with a cylindrical body that terminates with a flared end at the opposing free end of the stud 30. At the lower portion of the housing 20 a flexible strap 61 extends out of the bottom in a similar direction of the line passage.

The flexible strap 61 is secured at a first end to the housing 20 with a plurality of fasteners or screws 50 that pass from the upper side of the housing, through the flexible strap 61 and into a bottom 51. The second end of the flexible strap 61 has a backer 62 mounted to the top of the flexible strap 61 and a slotted plate 63 that is mounted on the bottom of the flexible strap 61 with a backer 70. A fastener joins the backer 62 through the flexible strap 61 to the slotted plate 63. FIG. 4 shows the sandwich of the backer 62 through the flexible strap 61 to the slotted plate 63 and FIG. 5 shows some broken line details of the slotted plate 63.

The slotted plate 63 has a key 64 that has a rounded opening where the end of the stud 30 can pass into the slotted plate 63 and then the head of the stud 30 can pass under the slotted plate 63 where the cylindrical shaft of the stud 30 and then under the slotted plate 63 so the shoulder 65 maintains the head of the stud 30 within the slot. The slotted plate 63 has an end-of-key 67 that hold the majority of the bottom of the tab 45 head of the stud 30 under the slotted plate 63. The end of the flexible strap 61 is shown with semi-squared end 66.

The semi-squared or semi-rounded end 66 of the flexible strap 61 is configured to contact the end 69 of the housing 20 under the saddle 46, the squared end 67 helps prevent rotation of the end of the flexible strap 61 to prevent the stud 30 from being dislodged from the key 64 in the slotted plate 63. The backer 62 is configured to fit within the saddle 46. FIG. 3 shows that the locking tab 40 is mounted through a pivot 43. A spring (not shown) biases the locking tab 40 to rotate 99 the teeth 42 on the locking tab 40 into the line outlet 22 to clamp onto a line that is inserted through the housing 20. A spring hole(s) 44 hold the ends of the spring (not shown). The housing limits backward rotation of the locking tab 40 when a user presses onto the rear of the lever 41.

Figure 5:
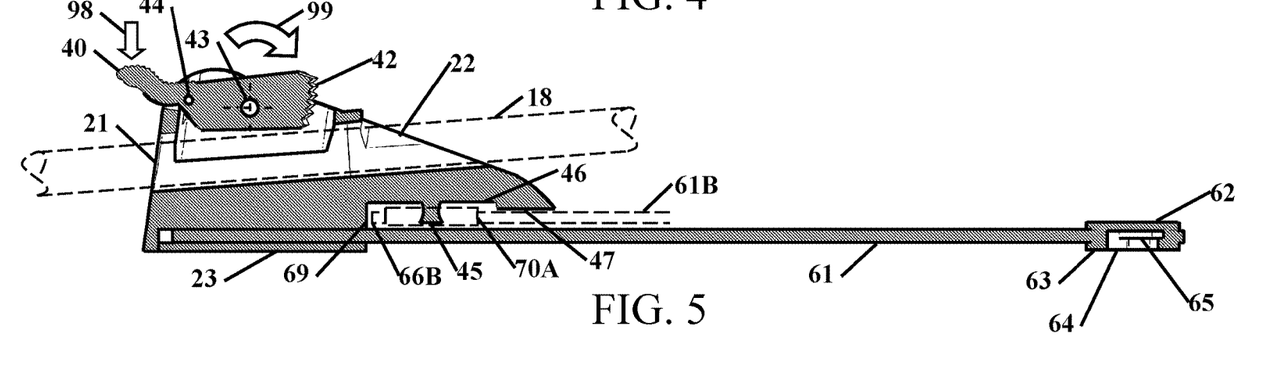
FIG. 5 shows a right-side sectional view taken through section 5-5 from FIG. 2.

FIG. 5 shows a right-side sectional view taken through section 5-5 from FIG. 2. Starting with the locking tab 40 that pivots on the pivot 43. A spring (not shown) will rotate 99 the locking tab 40 onto a line 18 so the teeth 42 of the locking tab 40 will brake movement of the line 18. When a user will push 98 down on the locking tab 40, the locking tab 40 will be lifted from the line 18 allow the line 18 to be fed into the housing 20 or moved freely through the housing 20. The line 18 is shown passing through the housing 20 between the line inlet 21 and the line outlet 22. The housing will form a stop to limit rotation of the locking tab 40. At the bottom of the housing 20 the flexible strap 61 is shown secured, clamped or sandwiched into the bottom 23 of the housing 20.

Between the flexible strap 60 and the saddle 46, the tab is shown with the bottom of the tab 45 flared wider at the free end of the tab 45. When the flexible strap 60 is folded and engaged in the housing (as shown in broken lines) as a strap locked position 61B, the backer 70A engages into the bottom of the tab 45. The end 66B of the flexible strap 60 is shown in proximity to the inside end 69 of the housing 20. This limits some free rotation of the flexible strap 60 when the strap locking feature is secured. Rotation of the backer 70A is further restricted by the recess of the saddle 46 under the tooth 47 of the housing 20. The cross-section of the backer 62 and the slotted plate 63 shows the opening for the key 64. When the bottom of the tab 45 is linearly engaged in the key, the end of the tab 45 is retained under the shoulder 65 of the slotted plate 63.

Figure 6:
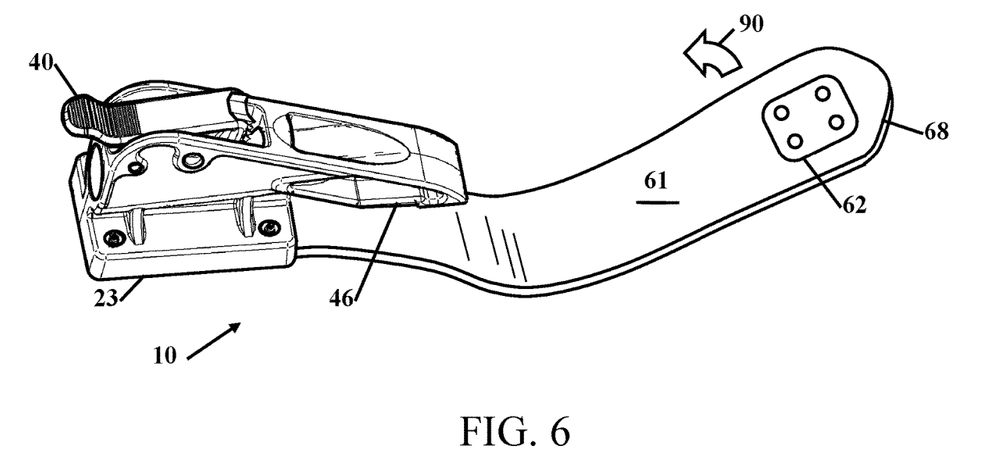
FIG. 6 shows a perspective view of the line brake with a strap, where the strap is being articulated.

FIG. 6 shows a perspective view of the line brake with a strap 10, where the strap 61 is being articulated. The strap 61 is shown with a more rounded end 68 with the backer 62 shown with fasteners securing the backer 62 to the slotted plate (not shown in this figure) on the other side of the flexible strap. The flexible strap 61 has a first end that is secured and extends from the bottom of the housing. The locking tab 40 is shown pivoting on the housing. A clearance is shown between the saddle 46 and the flexible strap 61. The flexible strap 61 is shown being bent 90 towards the housing.

Figure 7:
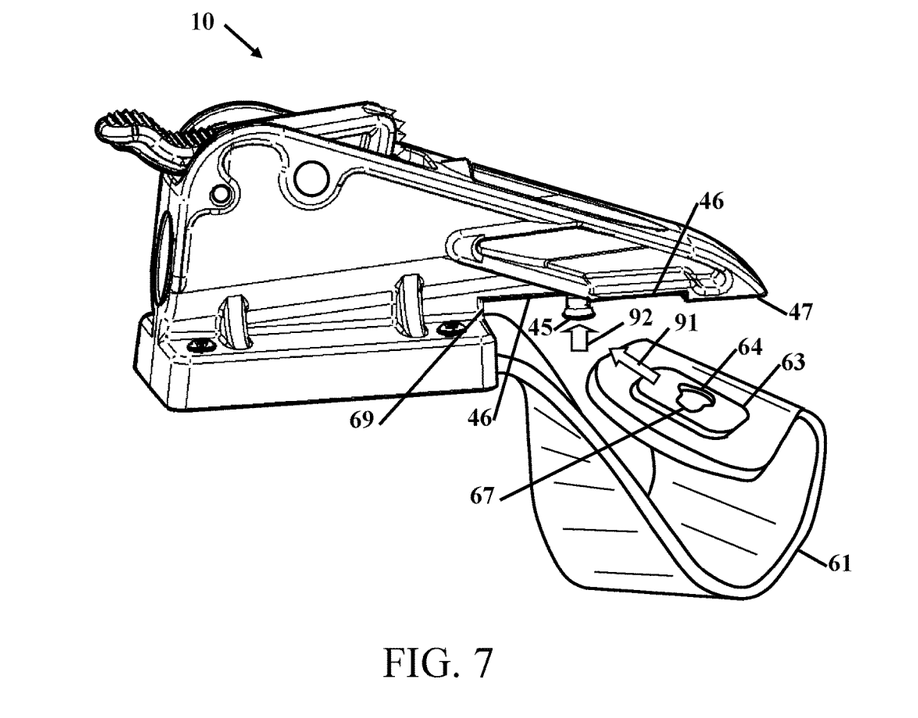
FIG. 7 shows a perspective view of the line brake with a strap, where the strap is being brought into connection.

FIG. 7 shows a perspective view of the line brake with a strap 10, where the flexible strap 61 is being brought into connection on the tab under the housing 20. As the flexible strap 61 is being brought to the bottom of the tab 45 the flexible strap 61 is rotated about 90 degrees the align the flexible strap 61 with the saddle 46 depression in the underside of the housing 20 between the tooth 47 and the inside end 69 of the housing 20. In this figure, the shape of the key 64 in the slotted plate 63 is shown with the larger key opening where the head of the bottom of the tab 45 can pass, along with the end of the key 67 where the shaft of the tab travels and stops. To engage the slotted plate 63 in the bottom of the tab 45 the slotted plate is moved 91 to align the large opening in the slotted plate 63 with the bottom of the tab 45 and then lifted 92.

Figure 8:
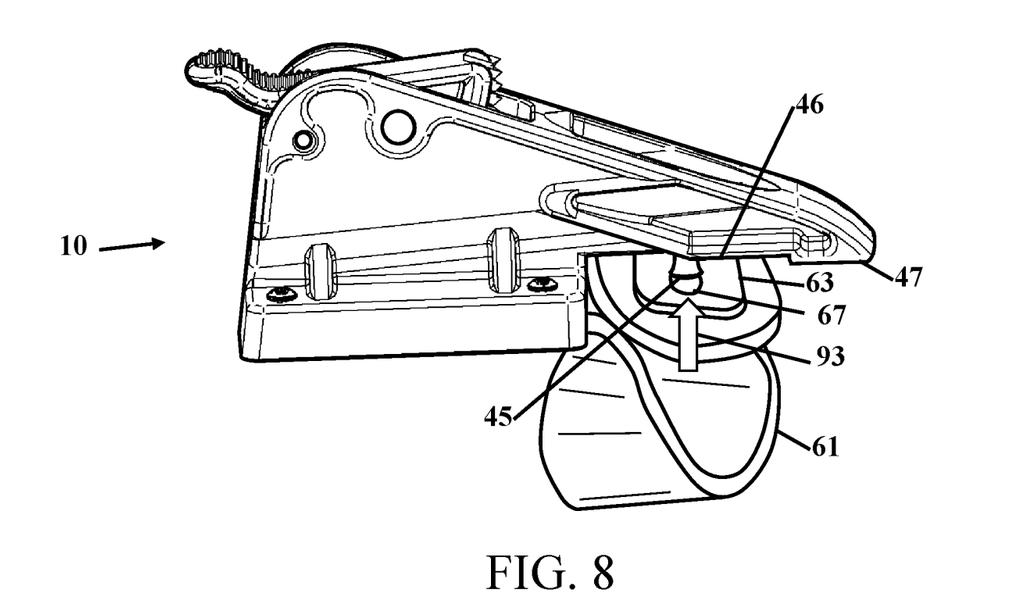
FIG. 8 shows a perspective view of the line brake with a strap, where the strap is being connected.

FIG. 8 shows a perspective view of the line brake with a strap 10, where the flexible strap 61. To engage the slotted plate 63 in the bottom of the tab 45 the slotted plate is lifted 93 and then slid along within the slotted plate 63 to lock the end of the flexible strap 61 in the housing. The shaft of the tab is stopped in the end of the key 67. As the flexible strap 61 is being brought to the bottom of the tab 45 the flexible strap aligns the flexible strap 61 with the saddle 46 depression in the underside of the housing 20 between the tooth 47 and the inside end of the housing.

Figure 9:
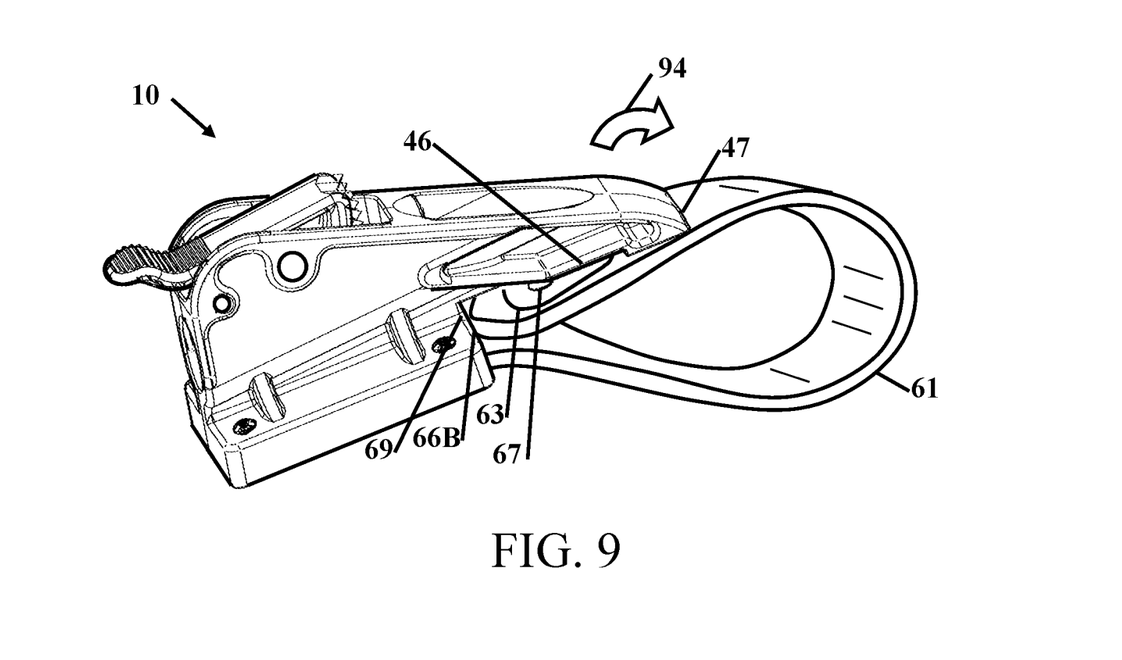
FIG. 9 shows a perspective view of the line brake with a strap, where the strap is connected.

FIG. 9 shows a perspective view of the line brake with a strap 10, where the flexible strap 61 is connected. After connection of the flexible strap 61 into the housing, the flexible strap 61 is rotated 94 to align the strap to the housing, as shown in this figure. The tab is held with the end of the key 67 in the slotted plate 63. The end 66B of the flexible strap 66B contacts the end 69 of the inside of the housing to reduce the tab from moving in the key to the slotted plate 63. Undesired rotation of the flexible strap 61 is further minimized by interaction of the slotted plate 63 in the saddle 46 behind the tooth. Removal of the flexible strap 61 from the tab 45 is performed in the reverse order.

Figure 10:
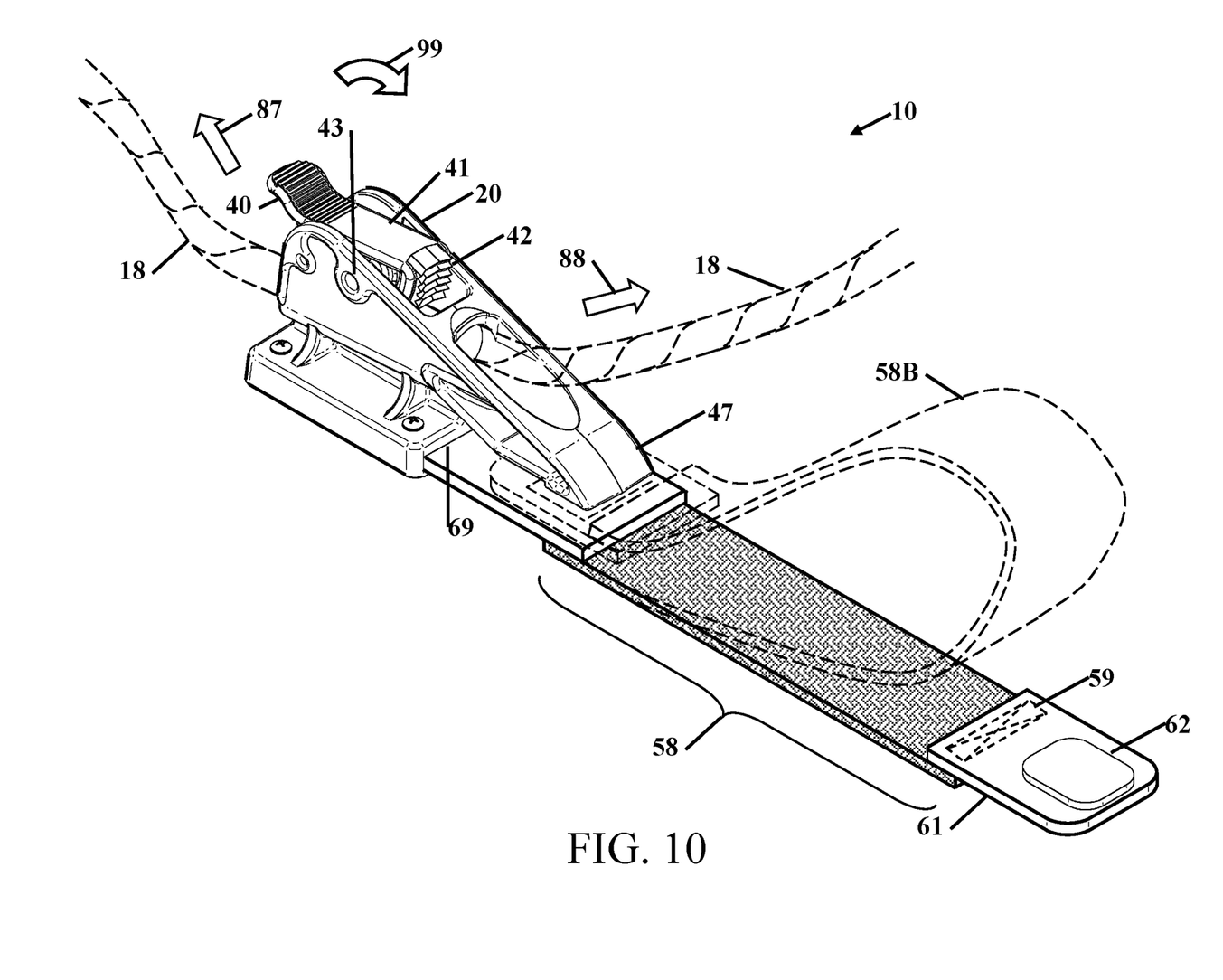
FIG. 10 shows line brake with a strap in an environment of use.

FIG. 10 shows line brake with a strap 10 in an environment of use with line 18 passing through the housing 20. The lever 41 of the locking tab 40 rotates 99 on the pivot 43 to bring the teeth 42 onto the line 18. Force of the lever creates a one-way grip on the line 18. When the line 18 is pulled 88 in one direction, the line 18 can slide under the teeth 42. When the line 18 is pulled 87 in the opposite direction, the teeth 42 will be pulled into the line 18 to prevent movement of the line 18.

The flexible strap 61 is shown with an elastic area 58 that is shown sewn with stitching 59 in the flexible strap 61. The elastic area 58 allows the inside diameter of the strap to expand or tighten. The backer 62 is shown on the end of the flexible strap 61. The flexible strap is shown wrapped 58B. When the flexible strap is wrapped 58B the head of the flexible strap can be engaged in the tab under the tooth 47 with the end of the flexible strap 61 in proximity to the end 69 under the housing 20.

Thus, specific embodiments of a line brake with a strap have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A line brake with a strap comprising:
   a housing;
   said housing having an opening that is configured for a line to pass through said opening;
   said opening includes a one-way line brake that allows movement of a line through said brake in a first direction of travel and stops movement of said line in an opposite direction of travel;
   said housing having a flexible strap secured at a first end to said housing;
   said housing having a tab that extends from said housing;
   said tab having a first end that is secured to said housing and a second end that has an enlarged head;
   said flexible strap having a second end that flexes on said housing, and
   a locking feature placed on said strap that is configured to lock onto said housing.

2. The line brake with strap according to claim 1, wherein said locking feature includes a key shape hole.

3. The line brake with strap according to claim 2, wherein said key shape has an opening that is configured for said head to pass into said key shape hole.

4. The line brake with strap according to claim 3, wherein said key shape hole further includes a slotted area that is narrower than said head.

5. The line brake with strap according to claim 1, wherein said housing further includes a saddle.

6. The line brake with strap according to claim 5, wherein said saddle is recessed above a tooth in said housing.

7. The line brake with strap according to claim 6, wherein said locking feature recesses in said saddle in said housing.

8. The line brake with strap according to claim 7, wherein said saddle reduces rotation of said locking feature within said saddle.

9. The line brake with strap according to claim 7, wherein said tooth reduces rotation of said locking feature.

10. The line brake with strap according to claim 7, wherein said housing has a wall that reduces rotation of said locking feature.

11. The line brake with strap according to claim 1, wherein said flexible strap has an elastomeric section located between said housing and said locking feature.

12. The line brake with strap according to claim 1, wherein said second end of said flexible strap is rotated to engage said locking feature into said tab.

13. The line brake with strap according to claim 1, wherein said line brake has a lever that is rotated by a spring that biases said lever into a line passage.

14. The line brake with strap according to claim 13, wherein said line brake allows a line to be pulled on only one direction through said line passage.

15. The line brake with strap according to claim 1, wherein said line brake has a manually operable lever.

16. The line brake with strap according to claim 1, wherein said flexible strap is configured to wrap around an item selected from a group consisting of a post, a pole, a line, a rail, a cord, a capstan, a handrail, a cleat, a post a cord or an anchor.

17. The line brake with strap according to claim 1, further includes a plurality of locking features that are placed along a length of said flexible strap.

18. The line brake with strap according to claim 1, wherein said flexible strap is secured to said housing with at least one fastener that sandwiches said flexible strap to a bottom of said housing.

19. A line brake with a strap comprising:
   a housing;
   said housing having an opening that is configured for a line to pass through said opening;
   said housing having a flexible strap secured at a first end to said housing;
   said housing having a tab that extends from said housing;
   said tab having a first end that is secured to said housing and a second end that has an enlarged head;
   said flexible strap having a second end that flexes on said housing;
   a locking feature placed on said strap that is configured to lock onto said housing, and
   said housing further includes a saddle wherein said saddle is recessed above a tooth in said housing, and said locking feature recesses in said saddle in said housing.

20. The line brake with strap according to claim 19, wherein said flexible strap is configured to wrap around an item selected from a group consisting of a post, a pole, a line, a rail, a cord, a capstan, a handrail, a cleat, a post a cord or an anchor.

* * * * *